May 25, 1965   R. M. MAIN   3,184,901
GASEOUS CONCENTRATION AND SEPARATION APPARATUS
Filed Dec. 8, 1959

INVENTOR.
ROBERT M. MAIN
BY
ATTORNEY 3,184,901
GASEOUS CONCENTRATION AND SEPARATION
APPARATUS
Robert M. Main, Oakland, Calif., assignor, by mesne assignments, to Laboratory for Electronics, Inc., Boston, Mass., a corporation of Delaware
Filed Dec. 8, 1959, Ser. No. 858,284
7 Claims. (Cl. 55—102)

This invention relates in general to gas purification and concentration and in particular to a system for the concentration of the contaminants in a gas flow using an electrostatic field.

The problems of purification of gases and concentration and removal of contaminant materials in gas flows arise in many different fields of technology. Thus, purification of gases to remove contaminants of both a gaseous and solid nature from a main stream of gas is required in industrial applications where pure gas such as helium is needed for heli-arc welding techniques, and in other circumstances where a pure atmosphere of a particular gas is necessary for specialized techniques of metal fabrication and treatment. Again gaseous purification by removal of a particular contaminant is often required in order to preserve a particular environmental gaseous atmosphere. An example of this type of application would be the removal of contaminant gases such as carbon dioxide in sealed airplane cabins or submarine interiors. Some particularly critical problems of this nature have arisen in connection with the atomic energy program. In this latter connection, for example, a gaseous coolant such as helium may be flowed through a nuclear reactor in which it undergoes vast irradiation from neutrons. Helium itself, under these conditions, does not react to form gamma ray emitting radioisotopes which may poison other parts of the system or give rise to personnel hazards at a point of the system removed from the reactor itself. However, even minor trace amounts of a particular contaminant may have a high cross section for neutron irradiation and give rise to unwanted radioactive products in the gas. A second problem in regard to helium coolants is the possibility of a minor leak in the gas coolant system, allowing gaseous fission products to become drawn into the helium flow system and these again would give rise to poisoning and personnel hazard effects. In this case a very critical problem of not only initial purification but maintaining purification and removing contaminants from a gaseous stream is presented. Another area in which these techniques could be of value is the area of combustion gases. Thus, if a petroleum product is combusted the exhaust gases will generally include carbon monoxide and non-combusted hydrocarbons. If these components are separated the hydrocarbons may be recycled to the combustion chamber and a much higher fuel efficiency obtained.

In the past there have been a variety of gas purification and gas contaminant systems developed relying on quite widely different physical and chemical properties for their effective operation. One such method relies on the chemical properties either of the contaminants or the main gas stream constituent and operates by passing the gas through a liquid or over a bed of chemical salts where the contaminant to be removed reacts, because of its chemical nature, preferentially with the liquid or the salt and thereby becomes removed from the stream. A second method employs a physical adsorber such as an activated charcoal bed which preferentially adsorbs the contaminant gases. Still other methods involve the use of diffusion screens which pass gases preferentially depending on molecular sizes, temperature traps which remove gases having higher boiling points from those having lower boiling points, and electromagnetic separators which operate to segregate the gases on the basis of their molecular mass.

All of the above means have more or less effectiveness in removing contaminants from gases depending upon the particular amount of contaminant and the nature of the contaminant. If the preferred method in any instance is relatively inefficient, then several stages are cascaded until a proper purification level is reached. In this way an effective system may constitute a complex purification train, even though the particular technique, viewed as a one stage operation, is relatively straightforward. Several of the above techniques, notably the chemical absorption, the physical adsorption, the diffusion screen and the temperature traps, present a high impedance to the main flow of gas; that is, the presence of the purification system greatly inhibits the flow of gas through the main stream and thereby causes some inefficiency in the overall application. A gas segregation system based upon electromagnetic separation on the basis of molecular mass generally does not present a high impedance to the main gas flow; however, in a rapid flow it calls for a large magnetic field and in the case of many contaminants the molecular mass of the contaminants may be quite close to the molecular mass of the main gas flow constituents, thereby rendering segregation by this method very difficult.

It is therefore a primary object of the present invention to provide an efficient, economic system for the concentration and removal of contaminants in a gaseous flow system while presenting a low flow impedance to the main stream of the gases.

It is another object of the present invention to provide a system for the removal and concentration of contaminants in a gas flow system in which the efficiency of the process does not depend upon a chemical affinity of the gas composition.

It is another object of the present invention to provide a highly efficient system for the removal of gaseous contamination in a gas flow stream which is also capable of removing particulate contamination.

Broadly speaking, the present invention employs an ion source to provide ionization in a gas stream and an electrostatic concentration means which concentrates the ions so formed near an outlet orifice which draws gas from the main stream because of a pressure differential between this orifice and the main stream. Such a system is particularly effective where either the contaminant gas is preferentially ionized or where all the gas is ionized indiscriminately and the contaminant gas preferentially retains its ionized condition. In either of these two cases this method will remove the contaminant from the main stream because the electrostatic field will act to concentrate only the charged molecules and the field will be arranged to concentrate these molecules near the orifice of an outlet tube, which, because of the pressure differential, will draw those gas molecules near it into it and out of the main gas stream. Such a system is particularly effective in the case of helium because helium has a higher ionization potential (24.0 ev.) than most other gases and hence can be discriminated against in terms of ionization. In the case where preferential ionization is not feasible and the helium is ionized as well as the contaminant gas, the helium because of its high mobility and high ionization potential will have a strong tendency to transfer its charge to the contaminant gas (usually of a lower ionization potential) and thereby neutralize itself, again creating a situation where the majority of ions in the gas stream are ions of the contaminant material rather than the main constituent gas.

In the case of solid particulate contamination, this invention again employs preferential ionizing of the particulate matter and concentrating it in the stream near the orifice by means of an electrostatic field. In the case of the particulate concentration, the present system differs from an electrostatic precipitator in that the solid particles are not collected on an electrode within the gas stream which then builds up a concentration of solid matter on the electrode, but rather are forced into the outlet gas stream and removed entirely from the main flow.

These and other objects and advantages will become apparent from the following detailed description when taken in conjunction with the accompanying drawing in which.

Figure 1:
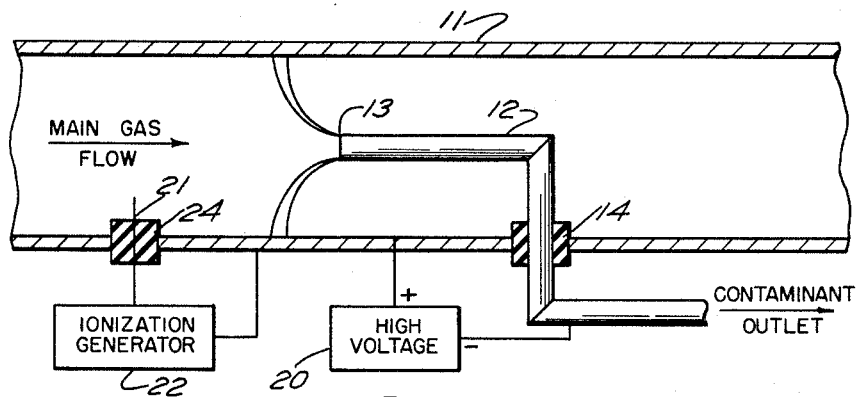
FIG. 1 is a view, partly in perspective and partly in block diagrammatic form, of one embodiment of this invention.

With reference now specifically to FIG. 1, the main gas stream flows in the direction indicated through a cylindrical pipe 11. The inner wall of pipe 11 is formed of electrically conducting material. Another pipe 12, having its outer surface electrically conducting and of much smaller diameter than pipe 11, is concentrically mounted within pipe 11 and extends at right angles through the wall of pipe 11, but is electrically insulated from it by insulator 14. A high voltage supply 20 is coupled between pipe 12 and the wall of pipe 11, with its negative terminal connected to pipe 12. Thus with the conducting wall of pipe 11 as an outer electrode and the conducting wall of pipe 12 as an inner electrode, an electrostatic field is set up. An ionization generator 22 is connected to a slender wire 21 which is mounted in the wall of pipe 11 through insulator 24. In this instance it serves as an ionization source for the gas flowing through pipe 11 by creating a corona discharge around the tip of wire 21.

Operationally this embodiment may be inserted as a link in a gas flow system or the pipe 11 may be part of an already existing gas flow system. The gas to be purified, that is from which the contaminant is to be removed, flows in the direction indicated and the small concentrically mounted pipe 12 presents a very low impedance to the normal flow. The ionization source shown at 21 serves to ionize both the contaminant and the main constituent within the pipe in one instance, or may be arranged in a fashion to be described below to preferentially ionize only the contaminant gas. In the former case, that is where all the gas constituents are ionized indiscriminately, and provided that the contaminant gases are of lower ionizing potential than the gas to be purified, the ionization source is set a sufficient distance in front of orifice 13 of the small pipe so that the main constituent gas has become preferentially neutralized by collision with the contaminant gas, while the contaminant gas of lower ionization potential tends to either remain ionized or to acquire new ionizations by virtue of charged transfer from the main constituent gas. As a result the condition that obtains in the gas stream just prior to the orifice 13 is that there is a preferential concentration of ions of the contaminant gas, with the main constituent gas having less ions. The electrostatic field tends to concentrate the ions as indicated by the electrostatic field lines near the orifice of small pipe 12. The velocity within the small pipe will be higher than that of the main gas flow, and hence the pressure will be lower with a resultant drawing of the gas in the immediate neighborhood of the orifice within this outlet pipe 12. Since the action of the electrostatic field has tended to concentrate the ions which are preferentially of the contaminant rather than the main gas, then the outlet pipe preferentially removes contaminant gases from the main flow.

To take a specific instance, as previously indicated, the main gas may be helium with the contaminant gases fission product gases. Helium has the highest ionization potential of any element (in the order of 24 volts) while the fission product gases have a very much lower ionization potential. Thus by proper adjustment of the energy of the ionization source, the lower potential fission product gases will be more readily ionized than the helium and hence there will be a higher concentration of ions in these gases than in helium. In this case then the fission product gases will be preferentially withdrawn through outlet tube 12 from the main flow.

While the ionization source and generator indicated above employ essentially a corona discharge type of ionization, this is only an example and should not be construed as limiting the scope of the apparatus. Rather, any suitable ionization source will accomplish the purpose and many other types are available, such as an electron gun type of arrangement which accelerates electrons from a heated cathode. In this latter case, that is in which thermal electrons are accelerated, the acceleration field may be arranged so that the average energy gained by the electrons is sufficient to ionize the contaminant materials, but has a small probability of ionizing the main constituent gas. A particularly effective ionizing source may be formed from a beta emitting radioisotope. In this type of source a beta or alpha emitting isotope is preferred. The radioactive material is coated in this apparatus on the internal wall of conduit pipe 11, and creates ionization by virtue of the high energy electrons or alpha particles emitted. This type of ionizing source is particularly useful since it requires no external power.

Figure 2:
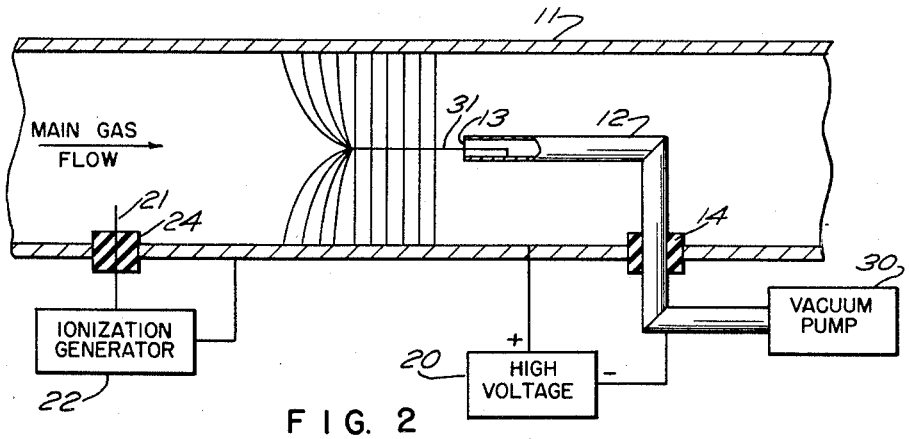
FIG. 2 is a view, partly in perspective and partly in block diagrammatic form, of another embodiment of this invention.

With reference now to FIG. 2, a second embodiment of this invention is shown in which the gas flow again is passing through a pipe 11. An ionization generator and corona wire are again shown at 22 and 21, as in FIG. 1. A concentric pipe 12 having an orifice at 13 is again mounted concentrically within pipe 11 and is carried out through a right angle bend through insulator 14. In this instance a vacuum pump 30 is shown coupled to the end of outlet pipe 12 and serves to accentuate the pressure drop and velocity increase within this pipe. In this embodiment a small diameter electrode wire 31 is mounted in an electrically conducting fashion to the inside wall of pipe 12 and extends through orifice 13 in an upstream direction along the axis of the main flow pipe 11. A high voltage supply 20 is again coupled between the electrically conducting wall of pipe 11 and the electrically conducting wall of pipe 12, hence providing a potential difference between the wall of pipe 11 and the electrode wire 31. The electrode wire 31 acts, because of its small diameter, to strengthen the field lines between the wall of pipe 11 and itself and thereby extends the force tending to concentrate the ions near the orifice 13 over a longer path. The appropriate wire length to be used depends upon the diffusion velocity of the contaminant gases in the neutralized state, since upon striking this electrode they will lose their charge and become neutralized. In order to be drawn within the outlet tube and hence removed from the main stream, their diffusion velocity must be such that they are sucked within the orifice 13 before they diffuse away from the immediate vicinity of this orifice. One method of improving this collection characteristic for a longer electrode wire is to coat the wire with a beta emitting radioactive substance such that the neutralized contaminant atom will tend to be reionized by the beta emission and hence remain in the vicinity of the electrode wire until they are drawn within the outlet tube 12.

Figures 3, 4:
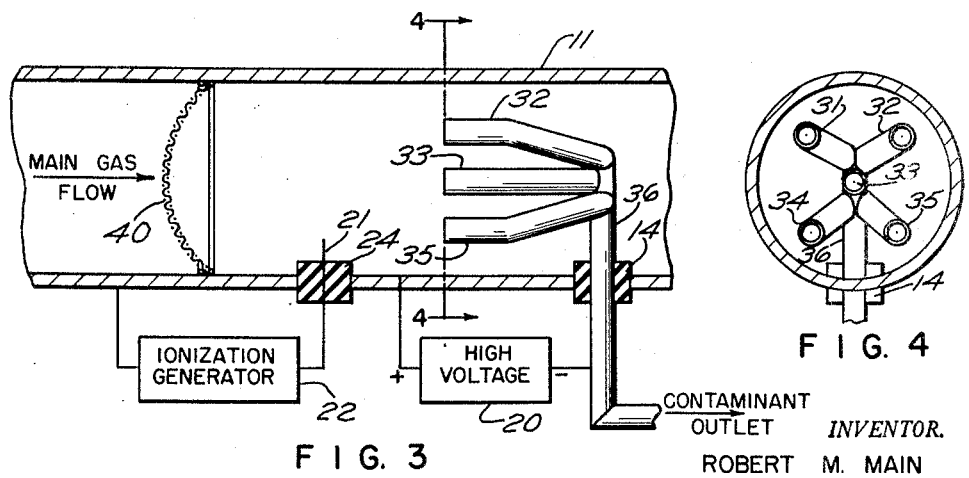
FIG. 3 is a view, partly in perspective and partly in block diagrammatic form, of another embodiment of this invention.
FIG. 4 is a cross sectional view taken along the line A—A of FIG. 3.

FIGS. 3 and 4 show another configuration of outlet tubes and electrode characteristics arranged for more efficient ion collection. The main gas flow pipe is again shown as pipe 11, but in this instance there are a group of five smaller pipes arranged within it. The five small pipes 31 through 35 all converge to a single outlet pipe 36 which again passes through insulator 14 in the wall of pipe 11. A high voltage supply 20 is again coupled between the conducting wall of pipe 11 and the conducting wall of pipe 36 which then renders each one of the small pipes 31 through 35 an electrode with a potential difference between each of these electrodes and the wall of pipe 11. An ionization generator 22 is again used with a corona wire 21 mounted in insulator 24 to create the ionization. In addition, in this embodiment, an additional electrode 40 is conductively connected to pipe wall 11 and is maintained at the same potential as the wall of pipe 11. Electrode 40 may be planar or dish shaped, as shown in the drawing, extending across the diameter of pipe 11 and hence, in order to provide a low impedance to the gas flow through this pipe, must be formed of wire mesh or other highly porous material. The purpose of this electrode is to considerably increase the efficiency of ion concentration near the orifices of the contaminant outlet pipes 31 through 35. A plurality of outlet pipes is used rather than increasing the diameter of a single outlet pipe in that the velocity of gas within the outlet pipe is higher for smaller diameters and the pressure is lower for smaller diameters, this being desirable from the point of drawing more contaminant gas within the pipes. A further advantage arises from the distribution in electrostatic field obtained by the use of five electrodes rather than one at the negative potential.

While the only specific gas mentioned above has been helium with fission product contaminants, it is apparent that the present invention will operate over a wide range of main constituent gases with a wide variety of contaminants, the essential characteristics of separation being a difference in the ionization potential between the main constituent gas and the contaminant.

The efficiency of this separation apparatus for a single stage will, in practice, be limited by the effect of the space charge formed by the contaminants near the outlet orifice. As indicated above the efficiency will vary with the differences in ionization potential between the main constituent gas and the contaminant. A higher efficiency will, in general, be realized when this difference is large.

The amount of potential to be applied to the electrodes and the power consumed will depend on the volume of gas flow as well as the electrode configuration.

In the previous discussion the contaminant and main constituent have both been gases, so that a two phase or multiple phase gas system has been discussed. The present invention will operate efficiently where the contaminant in the main constituent gas is of solid particulate nature rather than gaseous, in that the ionized particles will also be concentrated near the orifice of the outlet tube and will be drawn in a stream of the gaseous component within the outlet tube and hence removed from the main gas flow.

While the electrostatic field has been described previously as being generated by means of electrodes formed by the pipe wall and the outlet tube wall, the present invention includes any method of forming an electrostatic field concentrating the ions near the orifice of the outlet tube. Thus coils wound around the pipe and the like are also to be included within the scope of this invention.

In view of the fact that numerous modifications and departures may now be made by those skilled in this art, the invention described herein is to be construed as limited only by the spirit and scope of the appended claims.

What is claimed is:

1. Apparatus for selectively removing gaseous contaminant materials from a gaseous stream comprising, a first cylindrical pipe section adapted to serve as a conduit for said gaseous stream; a second pipe section of diameter small in relation to the diameter of said first pipe section, said second pipe section having an orifice within said first pipe section in a plane normal to the direction of flow of said gaseous stream, said second pipe section having a first portion mounted concentrically within said first pipe section and a second portion extending through the wall of said first pipe section, the inner wall of said first pipe section and the outer wall of said second pipe section being formed of electrically conducting materials, the electrically conducting wall of said second pipe section being electrically insulated from the conducting wall of said first pipe section; ionizing means located upstream of said orifice and within said first pipe section, said ionizing means being adapted to preferentially ionize said gaseous contaminant materials; a source of direct current voltage having positive and negative terminals, said positive terminal being electrically connected to the conducting wall of said first pipe section, said negative terminal being electrically connected to the conducting wall of said second pipe section to provide an electrostatic field radiating outwardly and upstream of said orifice, whereby said ionized gaseous contaminants are preferentially withdrawn through said second pipe section and out of said gaseous stream.

2. Apparatus as in claim 1 wherein said ionizing means comprises a small diameter electrode insulatedly mounted within said first pipe section; and a source of high voltage electrically connected to said electrode whereby a corona discharge is initiated within said first pipe section.

3. Apparatus for selectively removing gaseous contaminant materials from a gaseous stream comprising, a first cylindrical pipe section adapted to serve as a conduit for said gaseous stream, the inner wall of said cylindrical pipe section being formed of electrically conducting material; an outlet tube having an orifice within said pipe section and adapted to withdraw materials from the vicinity of said orifice out of said gaseous stream; ionizing means disposed upstream of said orifice and adapted to preferentially ionize said contaminant material; an electrode wire insulatedly mounted within said pipe section in the vicinity of said orifice, said electrode wire extending lengthwise in the direction along the axis of said pipe sectioned upstream from said orifice; a source of direct current voltage having first and second terminals, said first terminal being electrically connected to said electrode wire and said second terminal being electrically connected to said conducting wall of said pipe section, whereby said ionized gaseous materials are concentrated in the vicinity of said orifice and thereby selectively withdrawn from said gaseous stream.

4. Apparatus as in claim 3 wherein said electrode wire is coated with a radioactive beta emitting substance whereby said ionized gaseous materials are maintained in an ionized state.

5. Apparatus for selectively removing gaseous contaminant materials from a gaseous stream comprising a first cylindrical pipe section serving as a conduit for said gaseous stream; and outlet tube having a plurality of orifices disposed within said pipe section, said outlet tube extending through the wall of said pipe section and being adapted to withdraw materials from said gaseous stream through said orifices to discharge said materials outside of said pipe section; the peripheral wall of each of said orifices being formed of electrically conducting material; a planar electrode disposed upstream of said orifices within said pipe section in a plane normal to said pipe section axis, said planar electrode being formed of a material presenting a low impedance to the flow of said gaseous stream; said planar electrode being electrically insulated from the conducting materials forming the periphery of said plurality of orifices; means for selectively ionizing said contaminant materials, said ionizing means being disposed intermediate said planar electrode and said plurality of orifices; a source of direct current voltage having first and second terminals, said first terminal being electrically connected to said planar electrode and said second terminal being electrically connected to the conducting material forming the periphery of said orifices, whereby an electrostatic field is established in the area between said planar electrode and said orifices, said field being adapted to concentrate the ionized gaseous contaminants in the vicinity of said orifices.

6. Apparatus for selectively removing a first gas admixed within a stream of a second base gas flowing within a conduit comprising, an outlet formed with an orifice within said conduit and adapted to withdraw gas in the vicinity of said conduit from said stream, means including said outlet in the region of said orifice for establishing an electrostatic field extending substantially axially upstream within said conduit, means for preferentially ionizing one of said first and second gases upstream of said orifice, said electrostatic field being of intensity and configuration whereby said ionized gas is substantially segregated from the remainder of gas in said stream in the region of said orifice.

7. Apparatus for selectively removing a first gas having a first ionization potential from admixture with a gaseous stream of a second gas having a second and substantially higher ionizing potential comprising, an outlet tube having first and second orifices, said first orifice being located within said gaseous stream, said second orifice being located outside of said stream; a gas pump having an inlet and outlet, said inlet being operatively coupled to said second orifice of said outlet tube whereby gas is withdrawn from said stream through said outlet tube and said pump and discharged from said pump outlet; ionizing means disposed upstream of said first orifice and adapted to ionize a substantial portion of each of said first and second gases, said ionizing means being separated from said first orifice by a distance such that a substantial portion of said ionized second gas will have neutralized itself by ionizing collisions with said first gas before reaching said orifice; means independent of said ionizing means for establishing an electrostatic field adapted to concentrate said ionized gas in the region of said first orifice whereby said first gas is preferentially withdrawn from said stream.

References Cited by the Examiner
UNITED STATES PATENTS

| | | |
|---|---|---|
| 1,628,906 | 5/27 | Byrne. |
| 2,180,804 | 9/39 | Fahrenwold et al. _____209—127 |
| 2,197,864 | 4/40 | Johnson _____ 209—129 |
| 2,593,869 | 4/52 | Fruth. |
| 2,594,805 | 4/52 | Rommel. |
| 2,761,975 | 9/56 | Weisz. |
| 2,950,387 | 8/60 | Bruebaker. |

FOREIGN PATENTS

| | | |
|---|---|---|
| 309,149 | 7/30 | Great Britain. |
| 878,634 | 6/53 | Germany. |

GEORGE D. MITCHELL, *Primary Examiner.*

HERBERT L. MARTIN, WALTER S. COLE, WALTER BERLOWITZ, *Examiners.*